(12) United States Patent
Rimboym et al.

(10) Patent No.: US 8,141,843 B2
(45) Date of Patent: Mar. 27, 2012

(54) FLUID CONTROL VALVE

(75) Inventors: Vladimir Rimboym, Highland Park, IL (US); Vladimir Etinger, Wheeling, IL (US)

(73) Assignee: Dresser, Inc., Addison, TX (US)

( * ) Notice: Subject to any disclaimer, the term of this patent is extended or adjusted under 35 U.S.C. 154(b) by 592 days.

(21) Appl. No.: 12/347,051

(22) Filed: Dec. 31, 2008

(65) Prior Publication Data

US 2010/0163774 A1    Jul. 1, 2010

(51) Int. Cl.
*F16K 47/00* (2006.01)
(52) U.S. Cl. .................................. 251/127; 251/315.01
(58) Field of Classification Search .................. 251/118, 251/127, 315.01
See application file for complete search history.

(56) References Cited

U.S. PATENT DOCUMENTS

| | | | |
|---|---|---|---|
| 4,364,415 A | 12/1982 | Polon | |
| 4,479,510 A * | 10/1984 | Bey | 137/625.31 |
| 5,070,909 A * | 12/1991 | Davenport | 137/625.32 |
| 5,180,139 A * | 1/1993 | Gethmann et al. | 251/127 |
| 5,287,889 A | 2/1994 | Leinen | |
| 5,332,004 A * | 7/1994 | Gethmann et al. | 137/625.32 |
| 5,400,825 A * | 3/1995 | Gethmann et al. | 137/625.32 |
| 5,437,305 A | 8/1995 | Leinen | |
| 5,509,446 A * | 4/1996 | Bey | 137/625.32 |
| 5,511,584 A | 4/1996 | Leinen | |
| 5,758,689 A | 6/1998 | Leinen | |
| 5,771,929 A * | 6/1998 | Boger | 137/625.32 |
| 5,890,505 A * | 4/1999 | Boger | 137/1 |
| 6,029,702 A | 2/2000 | Leinen et al. | |
| 6,988,708 B2 | 1/2006 | Caprera | |
| 7,044,436 B2 * | 5/2006 | Corbetta et al. | 251/127 |
| 7,178,782 B1 * | 2/2007 | York | 251/127 |

* cited by examiner

*Primary Examiner* — John Fristoe, Jr.
(74) *Attorney, Agent, or Firm* — Woodcock Washburn LLP

(57) ABSTRACT

A valve includes a body, a throttling ball, and a shoe. The body includes an upstream flow passage and a downstream flow passage in fluid communication with an interior cavity of the body. The throttling ball is rotatable within the interior cavity on an axis to adjust the valve from a closed position to an open position and includes a fluid conduit extending through the throttling ball, where the fluid conduit is alignable with the upstream flow passage and the downstream flow passage. The shoe is disposed in the cavity abutting an interior surface of the cavity and includes a fluid passage there through having an inlet being alignable with the flow conduit of the throttling ball and an outlet being alignable with the downstream flow passage of the body. The interior surface of the shoe is disposed adjacent to and tracking an external surface of the throttling ball.

25 Claims, 10 Drawing Sheets

FLUID CONTROL VALVE

TECHNICAL FIELD

This disclosure relates to fluid regulation, and more particularly to regulating fluid flow by a ball valve with multiple stages of fluid pressure reduction.

BACKGROUND

Fluid systems, such as cooling, heating, petroleum refining, pneumatic or other vapor or gas system, waste water control, or chemical process systems, typically utilize valves to control or otherwise regulate fluid flow. These fluid control devices may include a variety of different types, sizes, and configurations of valves, such as globe valves, ball valves, butterfly valves, and plug valves. Several factors affect the design or choice of fluid control valves for any particular fluid application. As used herein fluid may encompass, liquid, vapor, gas, or a mixture of any of these fluid phases. For example, design consideration such as noise, pressure, and temperature, to name a few, may influence the type, size, and construction of any particular fluid control device chosen for a particular application.

Particular flow control valves typically include a body having an inlet and an outlet and a valve element between. In a ball valve, for example, the inlet, outlet, and valve element have a bore for allowing flow through the valve. At a high flow rate through the valve, the bore in the valve element may be fully aligned with the bores in the inlet and outlet of the valve body. However, at a low flow rate, the bore in the valve element may be substantially out of alignment with the bores in the valve inlet and valve outlet so as to restrict flow through the valve. At intermediate flow rates the bore in the valve element may be aligned in an intermediate position. When the bore in the valve element is out of alignment with the bores in the inlet and outlet of the valve body, the valve is in a throttling position restricting flow through the valve, which may introduce a loss of fluid pressure to the fluid being throttled.

Localized high-pressure drops may cause vibration and noise problems. For example, one problem associated with the throttling of pipeline flows with valves is the occurrence of "noise," which is caused by vibration in the valve and pipe caused by valve induced shear turbulence and vortices formed in the fluid passing through the valve.

Additionally, a portion of the valve element body may extend into the flow path at the valve inlet and present a reduced cross-section flow path for the fluid flowing through the valve. This reduced area may cause the fluid to accelerate into the valve element while the fluid stream loses pressure, i.e., the fluid expands as it enters the valve element. These changes may be non-uniform in the flow path through the valve, because portions of the fluid flow may not be directly affected by the movement of the ball to alter the flow path through the ball, whereas other portions of the fluid stream may be substantially effected. As a result, shear occurs within the fluid stream where high pressure, low velocity portions of the fluid stream contact high velocity, low pressure fluid stream areas through the valve. This shear can induce noise and/or cavitation in the valve which can destroy the valve or render it unsuitable for use in noise sensitive areas.

For cavitation or noise attenuation, it may be desirable to spread the pressure drop taken by a valve over as many components within the valve as possible. Each component has a pressure drop ratio: a ratio of pressure drop divided by inlet pressure to that component. Under specified conditions, a valve restricts flow which results in an overall pressure drop. This overall pressure drop may be divided among the various components within the valve that contribute to flow restriction and thus to the overall pressure drop.

SUMMARY

In one general implementation, a valve according to the present disclosure includes a body, a throttling ball, and a shoe member. The body includes an upstream flow passage and a downstream flow passage in fluid communication with an interior cavity of the body. The throttling ball is disposed within the interior cavity and is rotatable within the interior cavity on an axis to adjust the valve from a closed position to an open position. The throttling ball includes a fluid conduit extending through the throttling ball, where the fluid conduit is alignable with the upstream flow passage and the downstream flow passage. The shoe member is disposed in the cavity abutting an interior surface of the cavity and detachably secured to the body. The shoe includes a fluid passage there through having an inlet on an upstream side being alignable with the flow conduit of the throttling ball and an outlet being alignable with the downstream flow passage of the body. The shoe has an interior surface including at least a partial hemisphere with an opening therein, where the interior surface of the shoe is disposed adjacent to and tracking an external surface of the throttling ball.

In some specific implementations, the valve may further include a diffuser disposed through the throttling ball, where the diffuser includes a diffuser plate at an upstream end of the flow conduit. The diffuser plate may include a plurality of apertures allowing fluid communication there through substantially orthogonal with the axis of rotation of the throttling ball. Additionally, the diffuser plate may be a first diffuser plate and the diffuser may include a second diffuser plate proximate the fluid outlet. The second diffuser plate may include a plurality of apertures allowing fluid flow there through substantially orthogonal with the axis of rotation of the throttling ball.

In certain implementations, the valve may further include an internal trim disposed in the fluid conduit, where the internal trim includes a plurality of flow plates aligned substantially perpendicular to the axis of rotation of the throttling ball. Each flow plate may allow fluid communication through a plurality of orifices disposed through the flow plate, where the fluid communication through the orifices is substantially orthogonal to the fluid communication through the plurality of apertures of the diffuser plate. The flow plate may include a plurality of orifices there through allowing fluid communication substantially perpendicular to the axis of rotation of the throttling ball. In some aspects, the internal trim may include between and including two flow plates and five flow plates. Also, the internal trim may further include at least one support plate disposed generally parallel to the axis of rotations of the throttling ball and between at least two flow plates. The support plate may be secured to the at least two flow plates and allow fluid communication through a plurality of orifices disposed through the support plate. In some aspects, two flow plates and two support plates may form a rectilinear flow passage through the trim.

In certain embodiments, a cross sectional area of the shoe inlet may be substantially equal to a cross sectional area defined by a chord intersecting the surface of the throttling ball, where the shoe outlet has a cross sectional area substantially equal to a cross sectional area of the downstream flow passage. The chord intersecting the surface of the throttling ball may be shorter than the throttling ball diameter. Further, the interior cavity may be substantially cylindrical and an exterior surface of the shoe may be adapted to mate with at least a portion of an interior cylindrical surface of the body.

In specific implementations, the valve may further include at least one of an inlet closure member detachably secured to the body and having the upstream flow passage there through and an outlet closure detachably secured to the body and having the downstream outlet passage there through. The inlet closure may include a sleeve insertable in the upstream flow passage, where the sleeve may be substantially cylindrical and adapted to allow fluid communication to the fluid body. The valve may further include an inlet diverter detachably secured to the sleeve in the upstream flow passage and extending from the sleeve. The inlet diverter may include a plurality of slots allowing fluid communication there through.

The valve may further include a seat adjacent the body, where the seat may be adapted to contact the throttling ball and substantially prevent fluid communication between the external surface of the throttling ball and the interior cavity. The throttling ball may further include a ball plate disposed in a downstream transverse passage of the throttling ball that intersects the fluid conduit through the throttling ball. The ball plate may include a plurality of orifices allowing fluid communication there through.

In certain aspects, the valve may further include a stem insertable through the body along the axis of rotation of the throttling ball, where the stem may be coupled to the ball on an inboard end of the stem and coupled to a valve actuator on an outboard end of the stem.

In another general implementation, a method of regulating a fluid includes providing a valve in fluid communication with an upstream flow passage and a downstream flow passage. The valve includes a body with an interior cavity in fluid communication with the upstream flow passage and the downstream flow passage; a throttling ball disposed within the interior cavity and including a fluid conduit extending through the throttling ball; and a shoe member disposed in the cavity abutting an interior surface of the cavity and detachably secured to the body, where the shoe includes a fluid passage there through having an inlet on an upstream side being alignable with the flow conduit of the throttling ball and an outlet being alignable with the downstream flow passage of the body, and an interior surface with at least a partial hemisphere with an opening therein. The interior surface of the shoe is disposed adjacent to and tracking an external surface of the throttling ball. The method further includes providing a fluid to the upstream fluid passage; rotating the throttling ball in the body from a closed position to at least partially align the flow conduit with the upstream flow passage and the downstream flow passage in a partially open position; and directing fluid communication from the upstream flow passage through at least a portion of the conduit of the throttling ball to the downstream flow passage.

In more specific embodiments, the valve may further include a diffuser disposed through the throttling ball, where the diffuser includes a diffuser plate at an upstream end of the flow conduit. The diffuser plate may include a plurality of apertures and the method may further include directing fluid communication from the upstream fluid passage through at least a portion of the diffuser plate apertures. Also, the valve may further include an internal trim disposed in the fluid conduit and including a plurality of flow plates aligned substantially parallel to the axis of rotation of the throttling ball, where each flow plate may include a plurality of orifices disposed there through. The method may further include directing fluid communication substantially perpendicularly from the diffuser plate apertures through the plurality of orifices of each flow plate.

In certain embodiments of the method, the partially open position may consist of about 45-degrees of rotation of the throttling ball about the axis of rotation. Directing fluid communication from the upstream flow passage through at least a portion of the conduit of the throttling ball to the downstream flow passage may include directing fluid communication from the upstream flow passage through at least a portion of the diffuser plate apertures substantially perpendicularly to the plurality of flow plates. The method may also include rotating the throttling ball from a first partially open position consisting of 45-degrees of rotation of the throttling ball about the axis of rotation to a second partially open position of about 60-degrees rotation of the throttling ball about the axis of rotation. Directing fluid communication from the upstream flow passage through at least a portion of the conduit of the throttling ball to the downstream flow passage may include directing fluid communication from the upstream flow passage to the plurality of flow plates.

In specific embodiments, the throttling ball may further include a ball plate including a plurality of orifices. The method may further include directing fluid communication through the plurality of orifices of the ball plate. Also, the valve may further include an inlet diverter extending into the upstream fluid passage and including a plurality of slots there through. The method may further include directing fluid communication through the plurality of slots of the inlet diverter. In some aspects, providing a fluid to the upstream fluid passage may include providing a gas to the upstream fluid passage.

Various implementations of a ball valve according to the present disclosure may include one or more of the following features. For example, the ball valve may allow for multiple stages of pressure reduction in a fluid flowing through the valve. The ball valve may also allow for decreased valve noise up to around 25 dBA as compared to other ball valves. The ball valve may also allow for reduced valve noise and cavitation while utilizing a cylindrical valve body. Further, the ball valve may provide for a more cost and time efficient manufacturing process of the valve with a cylindrical valve body. Various implementations of the ball valve may also provide for multiple flow passages through the valve substantially perpendicular to each other, thereby reducing fluid pressure. The ball valve may also provide for increased turndown capability as compared to other ball valves. Thus, the ball valve may allow for an approximately 200:1 turndown ratio. Additionally, the ball valve may allow for self-cleaning so that debris and material may not obstruct flow through the valve.

These general and specific aspects may be implemented using a device, system, or method, or any combinations of devices, systems, or methods. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Fluid regulation may be accomplished by a variety of different methods and devices, such as ball valves. The present disclosure relates to a ball valve with multiple stages of fluid pressure reduction. The ball valve includes a throttling ball disposed within the valve body, including a ball diffuser and internal trim element allowing fluid communication there through. The ball diffuser includes one or more diffuser plates with flow apertures that allow fluid communication there through to a flow plate of the internal trim. Fluid communication through a plurality of orifices disposed through the flow plate is substantially orthogonal to the fluid communication through the diffuser plates. The ball valve further includes a shoe that may be secured to the valve body or a closure element of the valve. The shoe includes a fluid inlet immediately adjacent at least a portion of the throttling ball and proximate to a fluid outlet of the valve body. The shoe also includes a fluid outlet substantially similar to a fluid outlet of the valve body. An interior surface of the shoe inlet disposed adjacent to the throttling ball is substantially hemispherical in shape.

Figure 1:
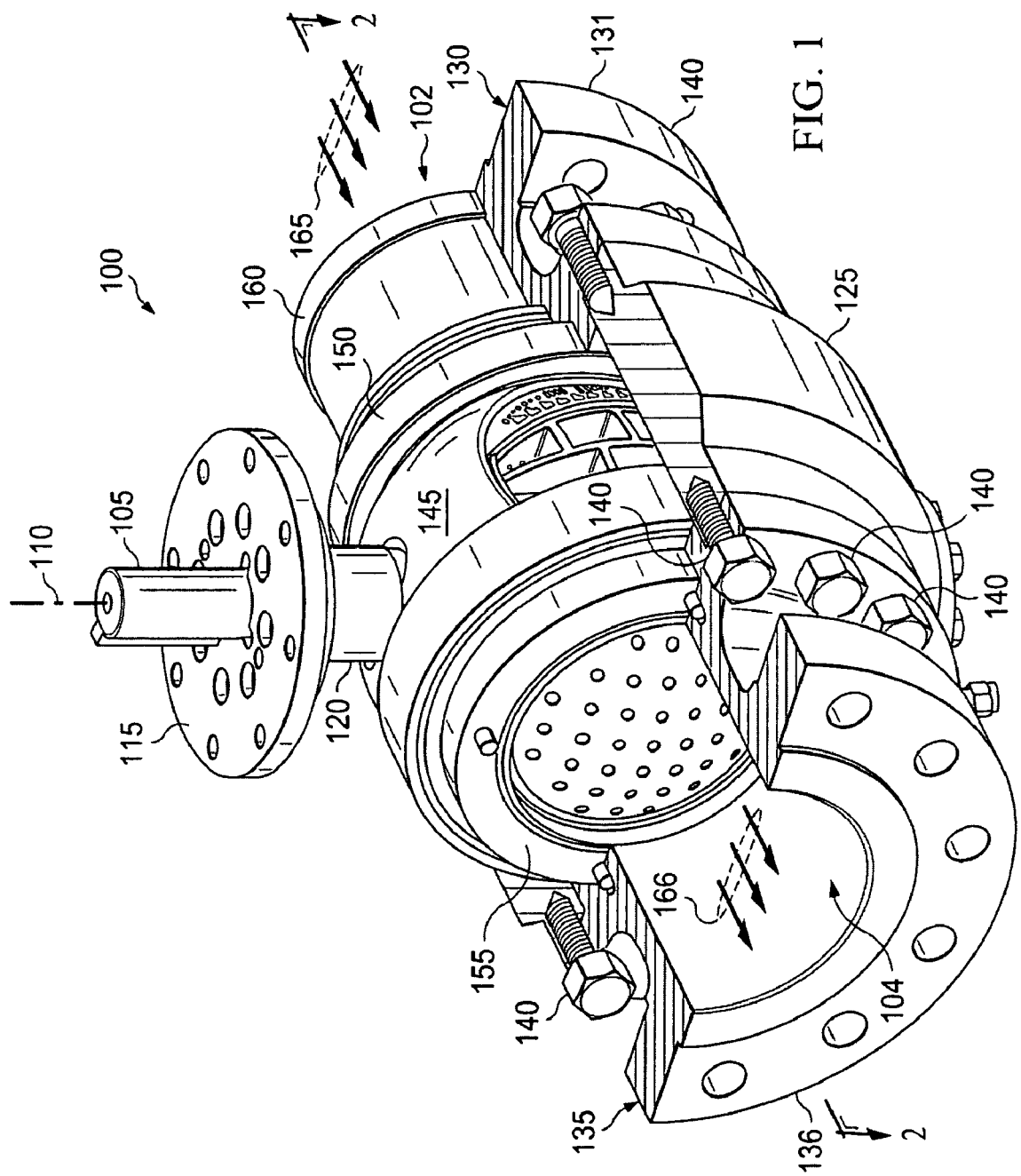
FIG. 1 illustrates a cross-section of a perspective view from above of a ball valve in accordance with the present disclosure in a fully closed position.

FIG. 1 illustrates a cross-section of a perspective view from above of a ball valve 100 in accordance with the present disclosure. The ball valve 100, generally, throttles or otherwise regulates an inlet fluid 165, such as a liquid, gas, vapor, or combination thereof. In some embodiments, the ball valve 100 is designed to throttle or otherwise regulate only a gaseous fluid. The ball valve 100 includes a stem 105 along an axis of rotation 110 disposed through the ball valve 100. The ball valve 100 further includes an adapter/connector plate 115 for connection to an actuator (not shown), a ball stem 120, a valve body 125, an inlet closure 130 with connector flange 131, an outlet closure 135 with connector flange 136, one or more bolts 140 securing the closures 130 and 135 to the body 125, a throttling ball 145, a seat 150, and a shoe 155. In certain embodiments, the ball valve 100 may also include a sleeve 160. In the embodiment illustrated connector flanges 131 and 136 are ANSI type flanges used to connect inlet and outlet piping elements to the valve. In other embodiments, threaded connectors or ring groove Victaulic type connectors and other connectors as known in the art may be used to connect inlet and outlet piping to the ball valve 100.

The valve stem 105 is generally a cylindrical rod extending through one or more components of the ball valve 100. Alternatively, the stem 105 may be a keyed member, as shown in FIG. 1. The axis of rotation 110 extends through a centerline of the stem 105 and, generally, provides a reference axis about which the stem 105 and the throttling ball 145 may rotate as the ball valve 100 is adjusted from 0-degrees rotation in a closed position to an open position with 90-degrees of rotation and back to the closed position, as well as all intermediate throttling positions of the ball valve 100 between 0-degrees and 90-degrees (e.g., 15% open, 45% open, 90% open). A rotational force may be supplied to the stem 105 by a valve actuator (not shown) coupled to the stem 105 with adapter/connector plate 115 at an outboard end of the stem 105 extending vertically through the connector 115. The actuator may supply rotational force to the stem 105 via a variety of actuator power sources, such as hydraulic, pneumatic, or electric, to name but a few. Thus, rotational force is transmitted from the stem 105 to the throttling ball 145 in order to adjust the position of the ball valve 100.

Typically, the valve stem 105 is coupled to the throttling ball 145 through a stem bearing 120. The stem bearing 120 may, in some aspects, at least partially seal the coupling interface between the stem 105 and the throttling ball 145, thereby substantially preventing fluid 165 from leaking from the ball valve 100. The stem bearing 120 may be constructed of a nylon material, elastomeric material, or a plastic polymer such as Teflon® (PTFE), Peek, Urethane, or Ethylene Propylene (EP), to name a few.

The stem 105, as well as many, if not all of the components of the ball valve 100, may be constructed from any appropriate material as dictated, for example, by one or more properties of the fluid 165 regulated by the ball valve 100. For instance, the stem 105 and other components of the ball valve 100 (e.g., the throttling ball 145 and subcomponents thereof, the inlet closure 130, the outlet closure 135, the body 125) may be constructed of a corrosion-resistant material, such as stainless steel, Nickel alloy, or titanium, to name a few. As another example, the material properties of the stem 105 and other components of the ball valve 100 may be dictated by a pressure or temperature (or both) of the fluid 165 regulated by the ball valve 100. Higher temperature or pressure fluids, such as various hydrocarbon gases or chemicals, may dictate the material of which the stem 105 and other components of the ball valve 100 are constructed.

The valve body 125 provides the main pressure barrier for the ball valve 100 and substantially encloses the components of the ball valve 100 in a rigid structure. As illustrated in FIG. 1, the inlet closure 130 and the outlet closure 135 are mechanically coupled to the valve body 125 through a flanged connection utilizing multiple bolts 140. In some embodiments of the ball valve 100, the body 125 and the inlet and outlet closures 130 and 135 may be constructed as an integral component.

The body 125, in some implementations, may be a cylindrical body such that an interior cavity of the body 125 is substantially cylindrical in shape. Alternatively, the body 125 may be a spherical body such that the interior cavity of the body 125 is substantially spherical. In any implementation, however, the valve body 125 provides a fluid passage or bore through which the fluid 165 may flow and be regulated by the throttling ball 145. The fluid passage includes a fluid inlet 102 and a fluid outlet 104.

The inlet and outlet closures 130 and 135 are coupled to the body 125 at the fluid inlet 102 and fluid outlet 104, respectively, and provide for, among other functions, connection locations for inlet and outlet piping of a fluid piping system.

For instance, as illustrated in FIG. 1, the inlet and outlet closures 130 and 135 provide flanged connections. Alternatively, the inlet and outlet closures 130 and 135 may provide for grooved piping connections or welded connections, as appropriate.

In certain embodiments, the inlet and outlet closures 130 and 135 may provide a fluid straightening path or bore upstream and downstream of the ball valve 100, such that fluid 165 entering or exiting the ball valve 100 has increased laminar flow characteristics as compared to flow characteristics of the fluid 165 as it travels through the fluid piping system. For example, in some instances, a straightening length of the inlet and outlet closures 130 and 135 may be at least partially dependent on a size of the ball valve 100. As the size of the ball valve 100 increases (e.g., from an 8 inch valve to a 12 inch valve), one or both of the inlet closure 130 and the outlet closure 135 may be lengthened to provide for a greater flow-straightening region. In some instances, straighter fluid flow entering or exiting the ball valve 100 may provide for increased performance of the ball valve 100, such as reduced noise or reduced cavitation.

In various embodiments of the ball valve 100, a sleeve 160 may be disposed within one or both of the bores of inlet and outlet closures 130 and 135. As illustrated in FIG. 1, the sleeve 160 may be disposed only in the inlet closure 130. The sleeve 160 typically, provides for an alternative surface to which one or more fluid pressure regulators may be secured (e.g., welded) rather than the inlet closure 130. For instance, as explained more fully with reference to FIG. 2, a flow inlet diverter 225 may be secured to an interior surface of the sleeve 160 adjacent an upstream surface of the throttling ball 145. The sleeve 160, in some embodiments, may be slipped into the bore of inlet closure 130 and be substantially cylindrical in form. Further, the sleeve 160 may be secured within the inlet closure 160 via a pipe or pipe fitting of the fluid piping system connected to the inlet closure 130, thus allowing the sleeve 160 to be removed from the inlet closure 130 upon removal of the ball valve 100 from the fluid piping system. Alternatively, the sleeve 160 may be permanently or semi-permanently secured to the inlet closure 130, such as by one or more spot welds.

The throttling ball 145 is enclosed and rotatable within the interior cavity of the body 125 and, typically, provides the main fluid regulating component of the ball valve 100. The throttling ball 145 may thus rotate from 0-degrees to 90-degrees about the axis of rotation 110 relative to the rotational force applied to the stem 105 by the valve actuator to open or close the ball valve 100 or throttle the valve 100 to any intermediate position. The throttling ball 145, as shown and described more fully with reference to FIGS. 2-5, may include one or more fluid pressure reducing elements therein, such that the pressure of the fluid 165 as it flows through the throttling ball 145 may be reduced in one or more stages. In addition, the throttling ball 145 is substantially spherical in form and may be constructed of any appropriate material according to, for example, the mechanical or chemical properties of the fluid 165 regulated by the ball valve 100.

As illustrated in FIG. 1, the seat 150 and the shoe 155 (described more fully with reference to FIG. 3C) may be enclosed within the valve body 125 proximal to the fluid inlet 102 and the fluid outlet 104, respectively, of the body 125. The seat 150, generally, is disposed between the body 125 and an upstream surface of the throttling ball 145 and may provide a fluid seal between the throttling ball 145 and the body 125. Thus, fluid 165 may be substantially prevented from flowing between the throttling ball 145 and the valve body 125, thereby directing the fluid 165 through the throttling ball 145 when the ball valve 100 is in the open or partially open position. As described more fully with reference to FIG. 2, one or more secondary sealing elements, such as gaskets or o-rings (such as gasket 260 and o-rings 255 shown in FIG. 2) may be disposed between the seat 150 and the body 125 to at least assist in preventing fluid communication between the throttling ball 145 and the body 125.

Figure 3A:
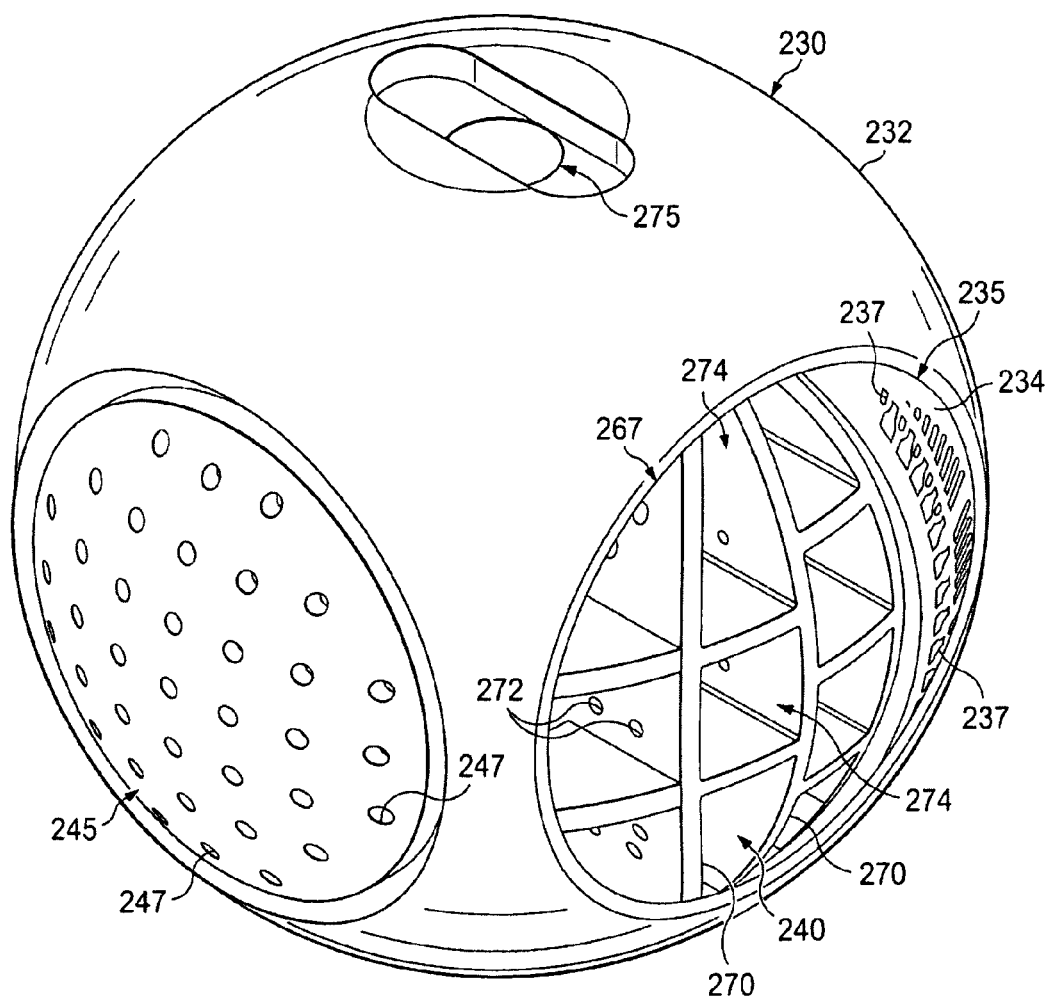
FIG. 3A illustrates a perspective view of one embodiment of a throttling ball element used in a ball valve in accordance with the present disclosure.
Figure 3B:
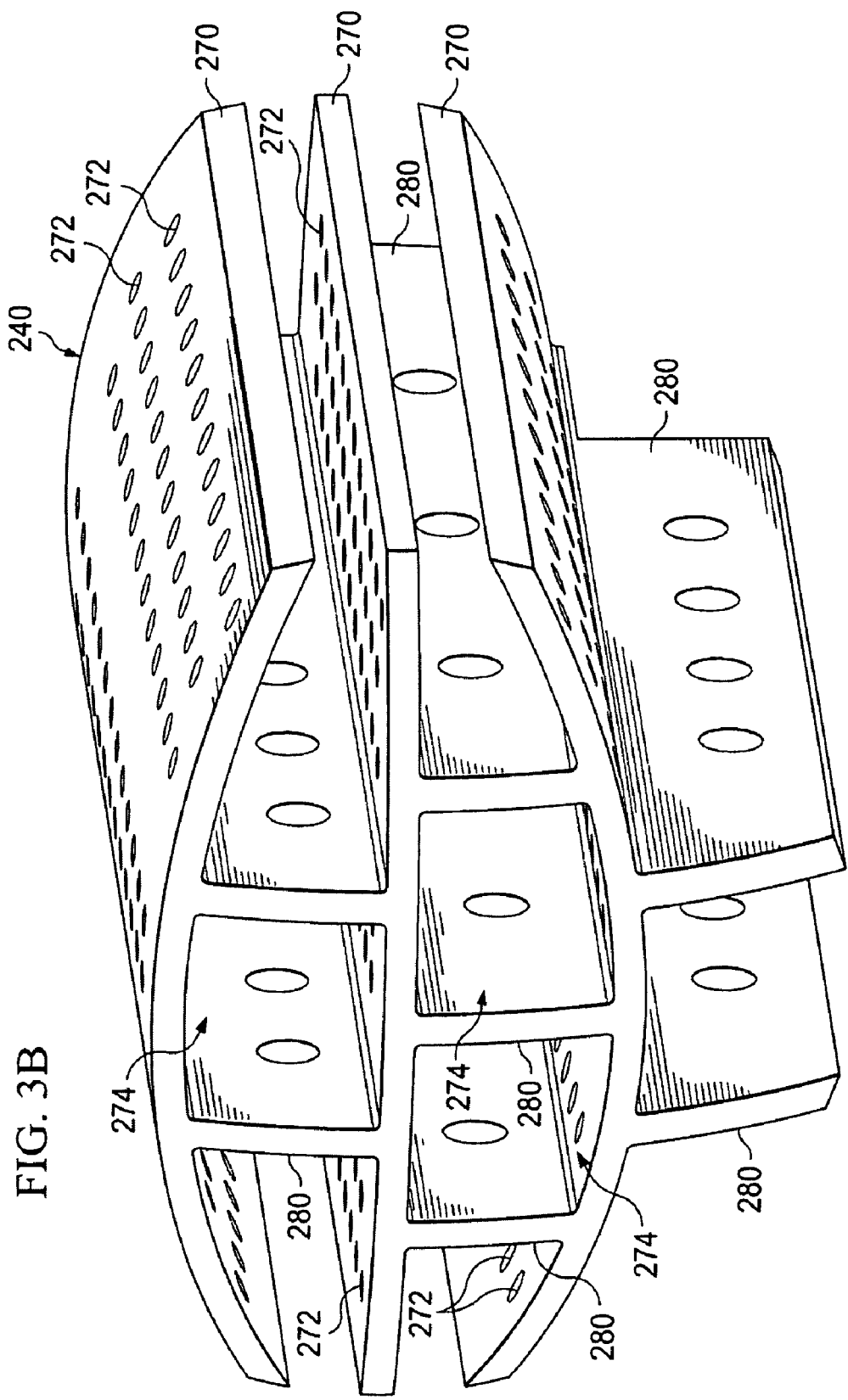
FIG. 3B illustrates a partial perspective view of one embodiment of an internal trim element used in a ball valve in accordance with the present disclosure.
Figure 3C:
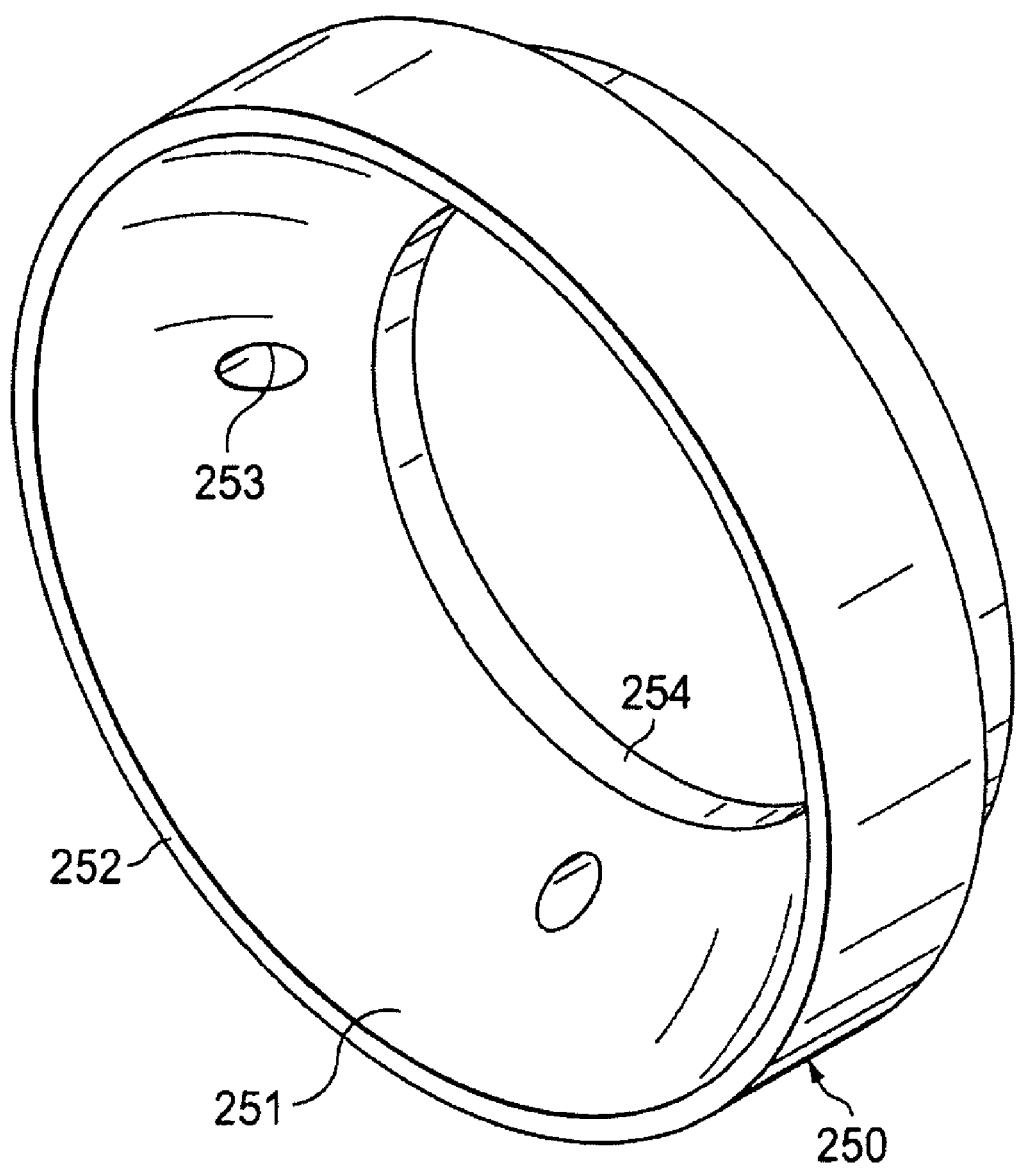
FIG. 3C illustrates a perspective view of one embodiment of a shoe element used in a ball valve in accordance with the present disclosure.
Figure 3D:
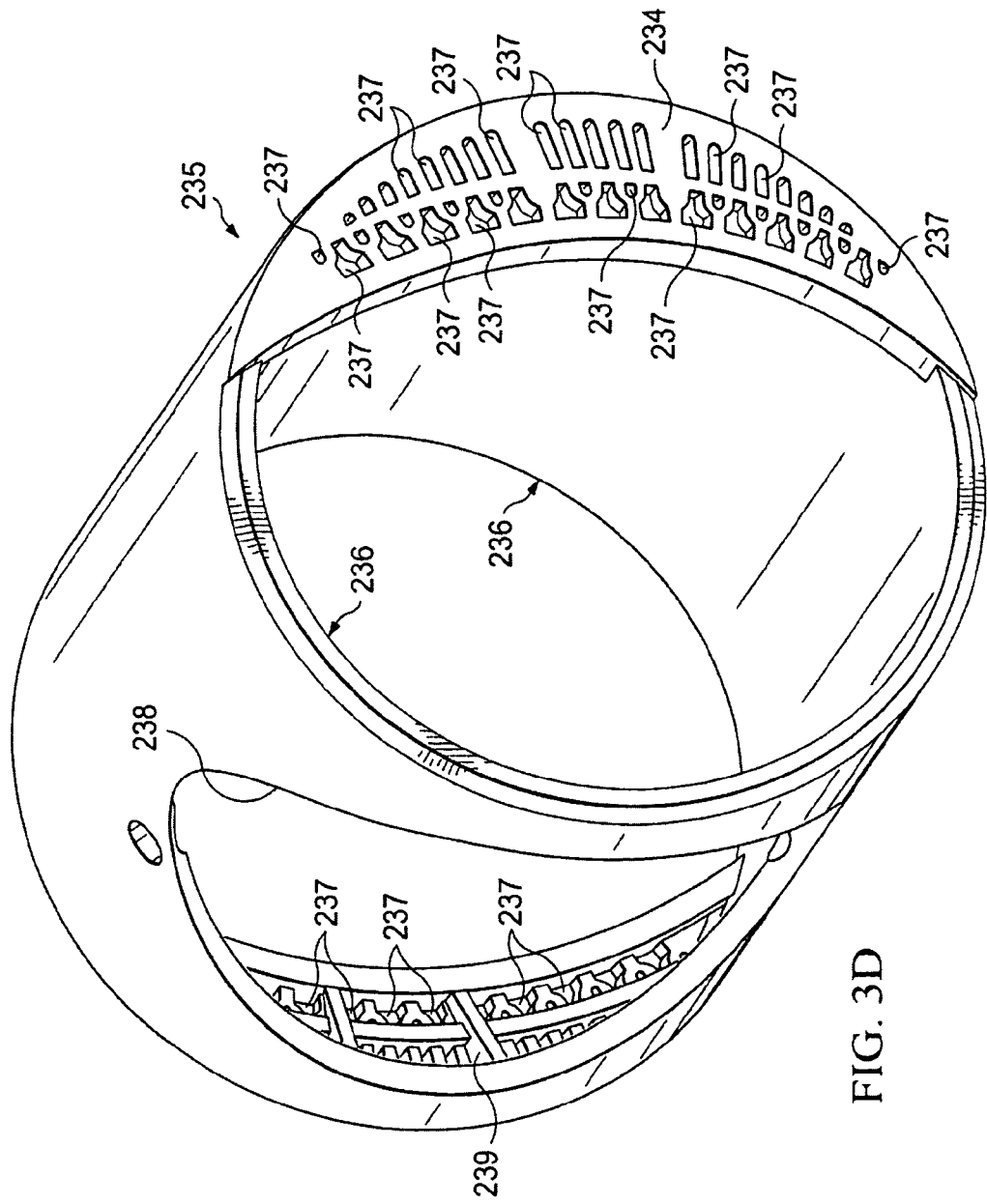
FIG. 3D illustrates a perspective view of one embodiment of a ball diffuser element used in a ball valve in accordance with the present disclosure.

The shoe 155, typically, is disposed between the body 125 and a downstream surface of the throttling ball 145 and may substantially prevent fluid from the fluid outlet 104 from flowing back toward the throttling ball 145 and from flowing between the throttling ball 145 and the body 125. Further, in some embodiments, the shoe 155 may, as illustrated more fully in FIGS. 3C-D, provide a substantially hemispherical interior surface 251 adjacent the throttling ball 145 within the substantially cylindrical valve body 125. Such spherical tracking of the interior hemispherical surface 251 of shoe 155 to the generally spherical shaped throttling ball 145 may provide considerable more predictability and control of the pressure drop through the valve than a spherical ball element in a cylindrical cavity without the shoe 155.

Figure 2:
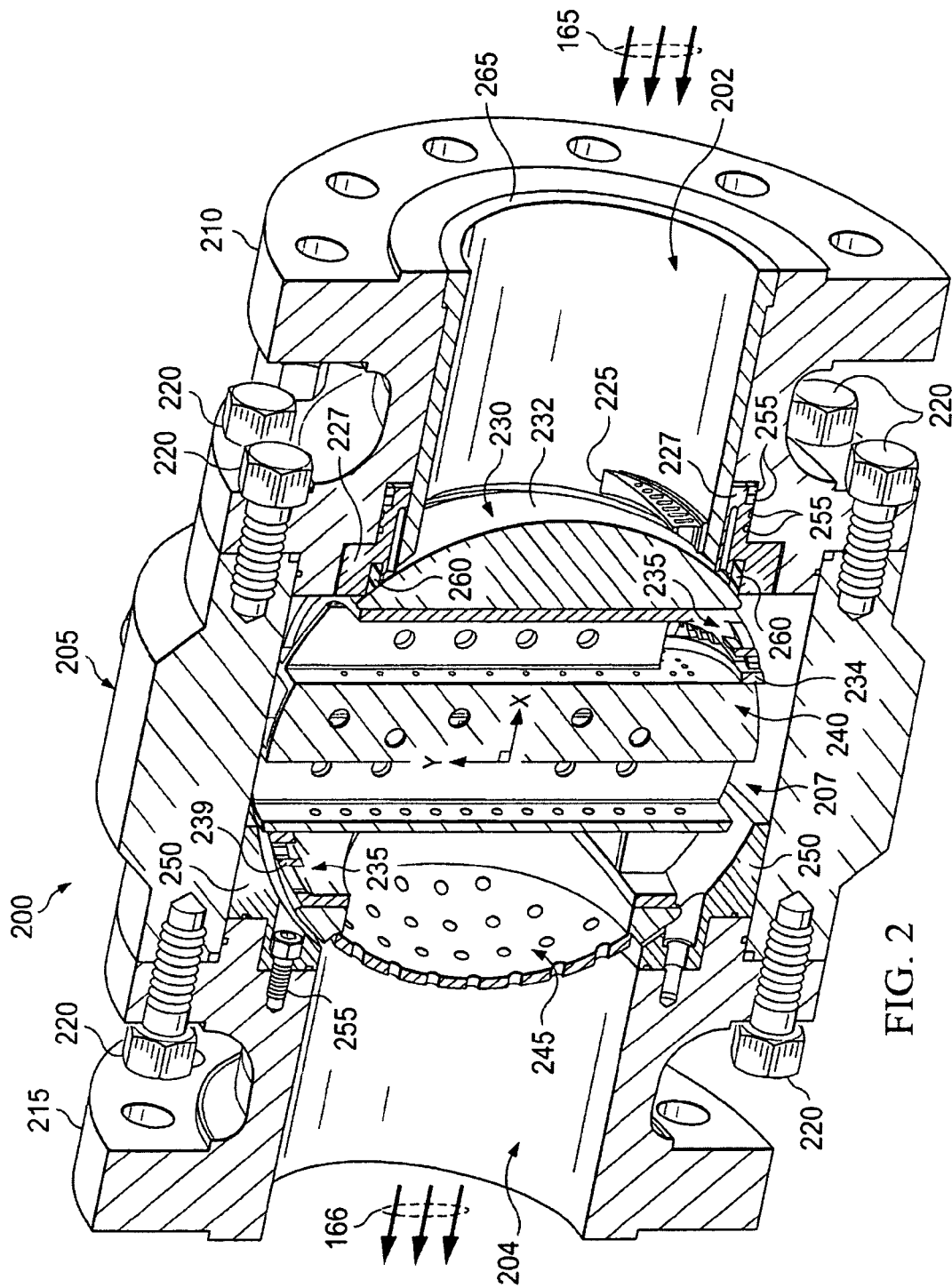
FIG. 2 illustrates a partial cross-sectional view of internal components of a ball valve in a closed position in accordance with the present disclosure.

FIG. 2 illustrates a partial cross-sectional view of internal components of a ball valve 200 in a closed position. In some embodiments, the ball valve 200 may be substantially similar to the ball valve 100 illustrated in FIG. 1. The ball valve 200 includes, among other components, a valve body 205, an inlet closure 210, an outlet closure 215, a seat 227, a throttling ball 230, and a shoe 250. Generally, the ball valve 200 regulates a volumetric flow and a pressure of a fluid, such as inlet fluid 165, as it travels through the valve 200, by rotating the ball 230 to permit fluid communication between a fluid inlet 202 and a fluid outlet 204 and exits with a reduced flow and/or pressure as exit fluid 166. In certain embodiments, the ball valve 200 may also be a shut-off valve, which may substantially prevent fluid communication between the fluid inlet 202 and the fluid outlet 204.

The valve body 205 generally encloses at least some of the components of the ball valve 200 and provides an interior cavity 207 in which the ball 230, the shoe 250 and at least a portion of the seat 227 may be disposed. Typically, the interior cavity 207 may be substantially cylindrical in shape. As a cylindrical interior cavity 207, the ball valve 200 may be more quickly manufactured. Further, the body 205 may be less costly to manufacture with a cylindrical interior cavity 207 as a cast component rather than, for example, a forged component. In some aspects, the body 205 with a cylindrical interior cavity 207 may be formed as a single-piece structure rather than a two-piece or multi-piece component. Additionally, in some embodiments, the body 205 with a cylindrical interior cavity 207 may be manufactured with lower required tolerances.

As noted above the spherical tracking of the interior hemispherical surface 251 of shoe 155 to the generally spherical shaped throttling ball 145 may provide considerable more predictability and control of the pressure drop through the valve than a ball element 150 in a cylindrical cavity without the shoe 155. Alternatively, in some embodiments, the interior cavity 207 may be substantially spherical in shape. As a spherical interior cavity 207, the ball valve 200 may be more costly to manufacture.

The inlet closure 210 is secured to the valve body 205 with multiple bolts 220 via a flanged connection. Alternatively, the inlet closure 210 may be integrally formed with body 205 or secured to the body 205 by, for example, a grooved-end piping connection. The inlet closure 210 may also provide a connection for the fluid piping system through which the fluid 165 may travel.

In some embodiments, a sleeve 265 may be inserted into a bore of the inlet closure 210 at the fluid inlet 202 of the ball valve 200. The sleeve 265 may be substantially similar to the sleeve 160 as described with reference to FIG. 1. As illustrated in FIG. 2, an inlet diverter 225 may be disposed in the fluid inlet 202 and secured to the sleeve 265. The inlet diverter 225, generally, provides an obstruction in the fluid inlet 202 for at least a portion of the fluid 165 entering the ball valve 200. The inlet diverter 225 may include one or more channels there through allowing fluid communication of the fluid 165 through the diverter 225. General background information on inlet fluid diverters can be found in U.S. Pat. Nos. 5,287,889; 5,437,305; 5,551,584; and 5,758,689, assigned to the common assignee of the present disclosure. Thus, the inlet diverter 225 may provide for a reduction of fluid pressure of the fluid 165 as the fluid 165 is communicated through the fluid inlet 202 and or provide noise reduction characteristics. In certain implementations of the ball valve 200, the inlet diverter 225 may provide for little to no pressure reduction of the fluid 165 when the ball valve 200 is open to a position greater than roughly one percent of full open.

In some embodiments, the inlet diverter 225 may also allow for a greater reduction in volumetric flow rate of the fluid 165 through the ball valve 200 as compared to a ball valve without the inlet diverter 225. For instance, the inlet diverter 225 may allow for the ball valve 200 to throttle the fluid 165 to about one-third percent of a volumetric flow rate at a full open position of the ball valve 200.

The throttling ball 230 is disposed within the interior cavity 207 and is substantially spherical in shape. Turning to FIG. 3A, this figure illustrates one embodiment of the throttling ball 230 used in the ball valve 200 in accordance with the present disclosure. The throttling ball 230 includes a solid surface 232, a flow conduit (bore) 267, a ball plate 245, and a stem passage 275. Generally, the throttling ball 230 provides for a flow passage (bore) through which the fluid 165 may be communicated through the ball valve 200 and also provides a closure element to substantially prevent fluid communication of the fluid 165 through the ball valve 200. Further, the throttling ball 230 may regulate the flow of fluid 165 through the ball valve 200 such that intermediate volumetric flow rates between zero and 100 percent flow may be achieved through 0-degrees rotation to 90-degrees rotation of the ball valve 200 about axis 110. For instance, in some embodiments, the throttling ball 230 may allow for about a 200:1 turndown ratio of the ball valve 200.

The solid surface 232 may include approximately one-quarter of the surface area of the throttling ball 230. Typically, the solid surface 232 includes substantially no apertures there through and is located opposite the ball plate 245 on the inlet side of ball valve 200 (as shown in FIG. 2). Thus, the solid surface 232 may substantially prevent fluid communication through the throttling ball 230 when the solid surface 232 is rotated to align with the fluid inlet 202.

The flow conduit 267 is disposed through the throttling ball 230 and provides for a fluid communication path through the ball 230. Generally the flow conduit 267 is substantially cylindrical in shape, but the conduit 267 may be any appropriately shaped aperture through the throttling ball 230.

An internal trim 240 is disposed within the flow conduit 267 and allows for fluid communication through the flow conduit 267. Turning briefly to FIG. 3B, this figure illustrates one embodiment of the internal trim 240 used in the ball valve 200. The internal trim 240 includes multiple flow plates 270 extending through the flow conduit 267 and across the throttling ball 230 in a generally horizontal position that is generally perpendicular to the axis of rotation of the ball. The internal trim 240 further includes multiple support plates 280 disposed between the flow plates 270 generally vertical position that is generally parallel to the axis of rotation of the ball. In some embodiments, the support plates 280 and flow plates 270 are secured (e.g., welded) together to form a single, integral internal trim element.

The flow plates 270 include multiple trim orifices 272 extending through the plates 270 and allowing fluid communication through the flow plates 270. Additionally, the staggered generally vertical support plates 280 disposed between the flow plates 270 form generally rectilinear trim channels 274 allowing fluid communication through the internal trim 240. As illustrated in FIG. 3B, the internal trim 240 may have three generally horizontal flow plates 270. Alternatively, the internal trim 240 may have two flow plates 270, five flow plates 270, or any number of flow plates 270 as the fluid application may dictate. For example, the size of the ball valve (e.g., 8 inch, 10 inch) may at least partially determine the number of flow plates 270 in the internal trim 240. As another example, one or more dimensions of the flow conduit 267, such as a diameter of the flow conduit 267, may at least partially determine the number of flow plates 270.

In some embodiments, the internal trim 240 may have one or more different design characteristics as that shown in FIG. 3B. For example, one alternate embodiment of an internal trim may include two flow plates installed in a throttling ball with a single support plate disposed between the two flow plates along a centerline of a flow conduit through the throttling ball. The top flow plate may be installed in the throttling ball substantially parallel with a direction of fluid flow through the flow conduit. The bottom flow plate may be installed in the throttling ball at a rising angle from an inlet of the flow conduit to an outlet of the flow conduit. The single support plate may be secured to the two flow plates proximate to the outlet of the flow conduit and extend fully or partially through the flow conduit of the throttling ball. In some implementations of this alternate embodiment, the throttling ball may be substantially cylindrical in shape rather than substantially spherical. Further, in some implementations of this alternate embodiment, a ball diffuser (such as the ball diffuser 235) may be provided with diffuser plates at the inlet and outlet of the flow conduit through the throttling ball. In some aspects, the inlet diffuser plate may be disposed in an upper hemisphere of the throttling ball while the outlet diffuser plate may be disposed in a lower hemisphere of the throttling ball. Additional embodiments of the internal trim and other components of a throttling ball are within the scope of the present disclosure and claims.

The internal trim 240 may also provide a reduction in fluid pressure as fluid 165 flows there through. For example, through the multiple trim orifices 272 and trim channels 274, the fluid 165 may be separated into multiple flows, thereby reducing the fluid pressure of the fluid 165. As the fluid 165 is separated into multiple flows through the internal trim 240 and pressure is reduced, noise generated by the ball valve 200 may be reduced.

In some instances, noise generated by a ball valve may be directly related to a magnitude of volumetric flow through the valve: as flow increases, noise may increase. Further, noise generated by the ball valve may be directly related to a magnitude of any single pressure drop of the fluid flowing through the valve: the larger the pressure drop the greater the noise generation. Thus, a ball valve at a given flow rate with a single, large pressure drop of the fluid may generate more noise than the same ball valve at the same flow rate with multiple stages of smaller pressure drops, where the sum of the smaller pressure drops is substantially equal to the large pressure drop. Thus, valve noise at a given flow rate may be reduced by splitting the total pressure drop through multiple stages of pressure drop and/or multiple channels of flow.

Referring again to FIG. 3A, the throttling ball 230 may also include a ball stem passage 275 through at least a portion of the ball 230. The stem passage 275 allows a valve stem (such as the valve stem 105 shown in FIG. 1) to be securely coupled to the throttling ball 230. Thus, a rotational force applied to the valve stem may be transmitted to the throttling ball 230 to rotate the ball from 0 to 90-degrees to adjust the valve 200 to the open position, the closed position, or any intermediate position. The stem passage 275 may have a circular opening, a keyed opening, or any other opening as appropriate.

Returning to FIG. 3A, a ball diffuser 235 may also be disposed through the flow conduit 267. In some embodiments, as illustrated here, the ball diffuser 235 may be inserted into the flow conduit 267 and shaped to form a substantially crescent inlet to the flow conduit 267. In some implementations, the ball diffuser 235 may include an inlet diffuser plate 234 disposed at an inlet of the flow conduit 267 and an outlet diffuser plate 239 disposed at an outlet of the flow conduit 267 (as shown in FIG. 2, for example). The inlet diffuser plate 234 includes multiple diffuser plate openings 237 allowing fluid communication to the flow conduit 267. The ball diffuser 235, therefore, may also reduce the fluid pressure of the fluid 165 during fluid communication through the ball valve 200. In some embodiments, the ball diffuser 235 may induce a reduction in pressure in the inlet fluid 165 when the ball valve 200 is in a partially open position. For example, the ball diffuser 235 may reduce the fluid pressure when the throttling ball 230 is rotated up to about 55-degrees toward the fully open position. Greater rotation of the throttling ball 230 toward the fully open position may result in no or substantially no pressure reduction of the fluid 165 by the ball diffuser 235.

Turning briefly to FIG. 3D, this figure illustrates one embodiment of the ball diffuser 235 with inlet diffuser plate 234 and outlet diffuser plate 239 used in the ball valve 200 according to the present disclosure. The ball diffuser 235 may be substantially cylindrical in shape to be insertable into the flow conduit 267 of the throttling ball 230. Further, the ball diffuser 235 may include a tubular hollow 236 there through so as to receive the internal trim 240 therein. A substantially circular aperture 238 may also be disposed on the ball diffuser 235 orthogonal to the tubular hollow 236 so as to allow fluid communication between the tubular hollow 236 and, for instance, the ball plate 245.

The throttling ball 230 also may include a ball plate 245 disposed in a transverse passage of the flow conduit 267. As illustrated in FIG. 3A, the ball plate 245 may be disposed on a side of the throttling ball 230 opposite the solid surface 230. The ball plate 245 includes multiple orifices 247 allowing fluid communication there through. The ball plate 245, therefore, may also reduce the fluid pressure of the fluid 165 during fluid communication through the ball valve 200. In some embodiments, the ball plate 245 may induce a reduction in pressure in the inlet fluid 165 when the ball valve 200 is in a partially open position. For example, the ball plate 245 may reduce the fluid pressure when the throttling ball 230 is rotated up to about 75-degrees toward the fully open position. Greater rotation of the throttling ball 230 toward the fully open position may result in no or substantially no pressure reduction of the fluid 165 by the ball plate 245.

Returning to FIG. 2, the seat 227 is disposed against the inlet closure 210 and, generally, encircles the fluid inlet 202 adjacent the throttling ball 230. The seat 227, typically, provides a fluid seal with the throttling ball 230, thereby substantially preventing fluid communication through the ball valve 200 between the throttling ball 230 and the body 205. Thus, the seat 227 may at least partially direct the fluid 165 through the flow conduit 267 of the throttling ball 230 when the ball valve 200 is in the open or partially open position. A gasket 260 may be inset into the seat 227 and provide for a further fluid seal with the throttling ball 230. The gasket 260 may be constructed of, for example, nylon, metallic material, or Peek, to name a few. Additionally, one or more o-rings 255 may be inset between the seat 227 and the inlet closure 210 to provide for a fluid-tight seal for the ball valve 200, thereby substantially preventing fluid 165 from leaking from the valve 200. Additional o-rings may also be inset between various components of the ball valve 200 (e.g., body 125, inlet closure 210, outlet closure 215, shoe 250) to help prevent fluid 165 from leaking from the valve 200.

Referring to FIGS. 2 and 3C, the shoe 250 is disposed against and detachably secured to the outlet closure 215 in the fluid outlet 204 adjacent the throttling ball 230. For instance, one or more shoe bolts 255 may secure the shoe 250 to the outlet closure 215. In some embodiments, the shoe 250 may also or alternatively be secured to the valve body 205. Turning briefly to FIG. 3C, this figure illustrates one embodiment of the shoe 250 used in the ball valve 200 in accordance with the present disclosure. The shoe 250 includes one or more bolt holes 253 through which the shoe bolts 255 may be inserted. The shoe 250 also includes a shoe inlet 252 and a shoe outlet 254. The shoe inlet 252, typically, is larger than the shoe outlet 254 (i.e., greater diameter). The shoe interior surface 251 may be adjacent the throttling ball 230 and include for a partial hemispherical surface 251 to substantially mirror and mate to the surface of the throttling ball 230. In such fashion, the shoe 250 may help prevent fluid communication from the fluid outlet 204 back between the throttling ball 230 and the body 205.

Figure 3E:
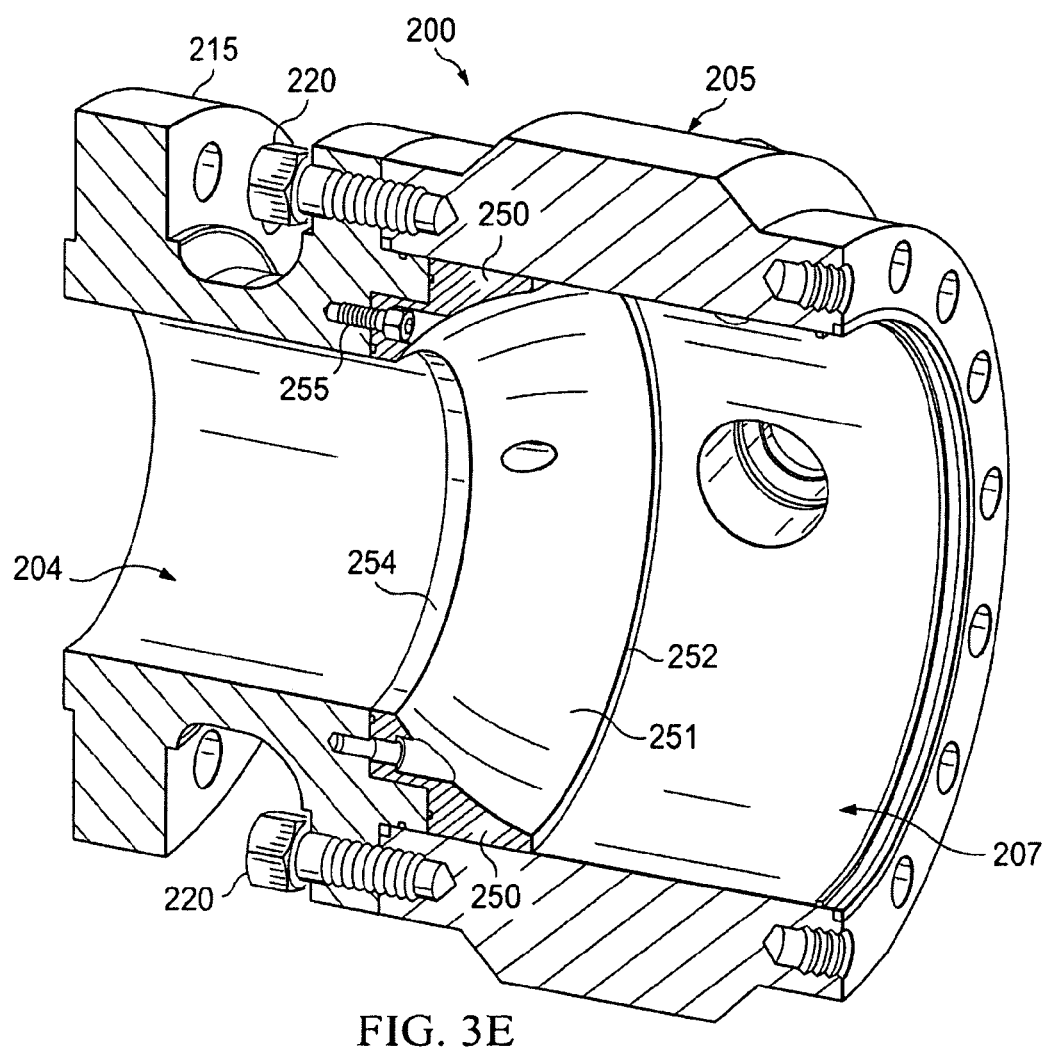
FIG. 3E illustrates a partial cross-sectional view of certain internal components of a ball valve in accordance with the present disclosure.

As noted above, the spherical tracking of the interior hemispherical surface 251 of shoe 155 to the generally spherical shaped throttling ball 230 may provide considerable more predictability and control of the pressure drop through the valve than a ball element 150 in a cylindrical cavity without the shoe 155. Turning briefly to FIG. 3E, this figures illustrates the interface between the shoe 250 and the valve body 205 and the outlet closure 215 as well as the partial hemispherical surface 251. As illustrated here, the interior cavity 207 is generally cylindrical upstream of the shoe inlet 252. Between the shoe inlet 252 and the shoe outlet 254, the interior cavity 207 is substantially hemispherical due to the interior surface 251 of the shoe 250. Thus, a hemispherical surface of the throttling ball 230 (not shown here) adjacent the interior surface 251 is substantially tracked or mirrored by the surface 251.

Returning to FIG. 2, the outlet closure 215 is secured to the valve body 205 with multiple bolts 220 via a flanged connection. Alternatively, the outlet closure 215 may be integrally formed with body 205 or secured to the body 205 by, for example, a grooved-end piping connection. The outlet closure 215 may also provide a connection for the fluid piping system through which the outlet fluid 166 may be transmitted from the fluid outlet 204.

In operation, FIG. 2 illustrates the ball valve 200 in a closed position, such that fluid communication of the fluid 165 between the fluid inlet 202 and the fluid outlet 204 is substantially prevented. To adjust the ball valve 200 to the closed position, the throttling ball 230 may be rotated about an axis substantially perpendicular to the fluid pathway (e.g., z-axis perpendicular to the x and y axes) from the fluid inlet 202 to the fluid outlet 204 such that the solid surface 232 of the throttling ball 230 is immediately adjacent the fluid inlet 202. In the closed position (0-degrees rotation), a combination of the seat 227, the gasket 260, and the solid surface 232 of the throttling ball 230 may create a substantially fluid-tight seal in the ball valve 200 to substantially prevent fluid communication through the valve 200.

Figure 4:
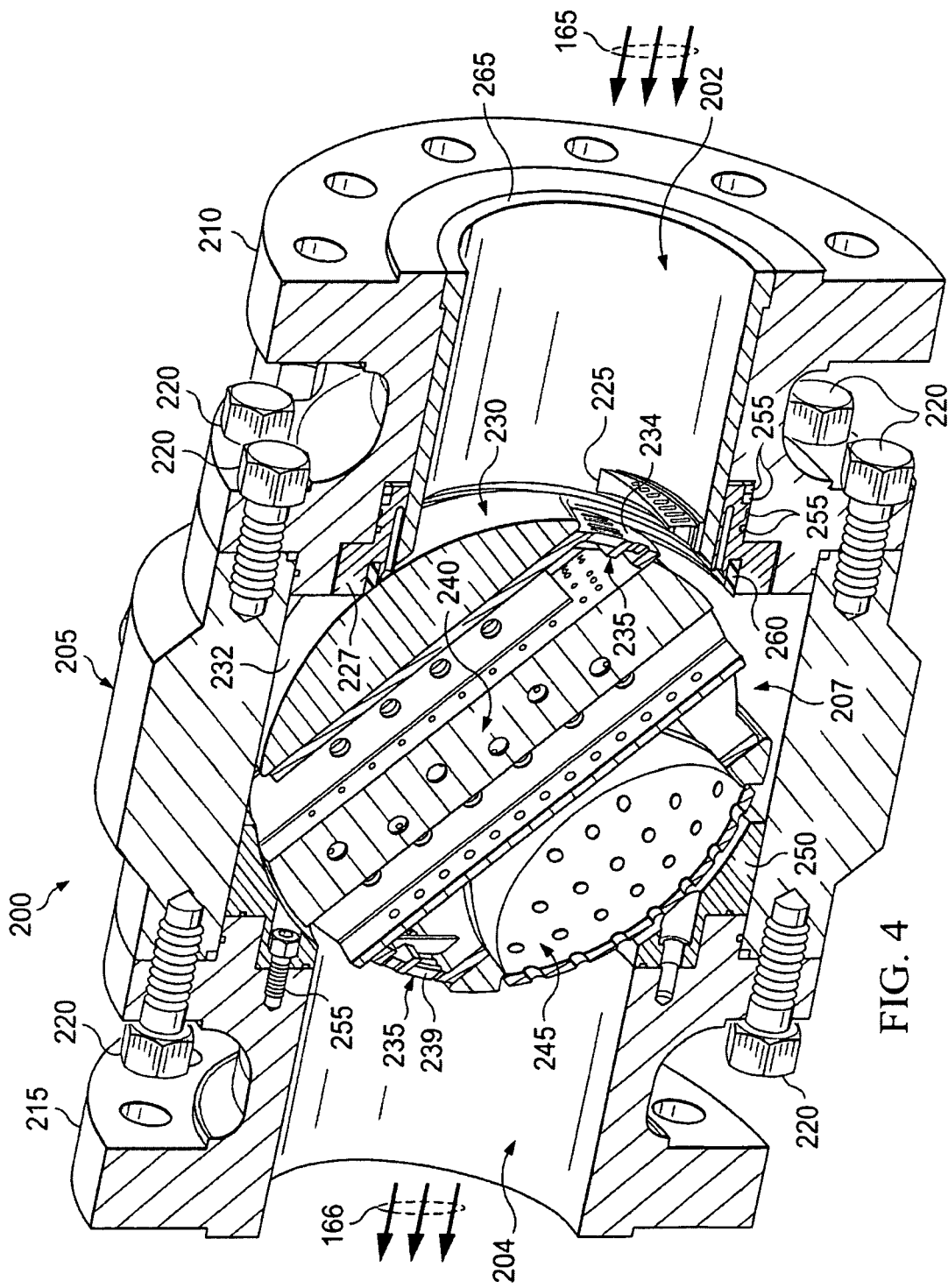
FIG. 4 illustrates a partial cross-sectional view of internal components of a ball valve in a partially open position in accordance with the present disclosure.

FIG. 4 illustrates a partial cross-sectional view of internal components of the ball valve 200 in a partially open position. The throttling ball 230 in the ball valve 200 in this figure may be rotated about 45-degrees from the closed position shown in FIG. 2. Thus, the ball valve 200 in FIG. 4 is partially open to allow fluid communication between the fluid inlet 202 and the fluid outlet 204. As the inlet fluid 165 enters the fluid inlet 202, at least a portion of the fluid 165 is communicated through the inlet diverter 225, thereby at least partially reducing the pressure of the fluid 165. This pressure reduction may, in some implementations, be negligible. The portion of fluid 165 passing through the inlet diverter 225 is then communicated in parallel to the inlet diffuser plate 234 and the internal trim 240.

Other portions of the inlet fluid 165 may be first communicated over the inlet diverter 225 and immediately to the ball diffuser 235 and the internal trim 240. As the fluid 165 passes through the openings 237 of the inlet diffuser plate 234, the pressure of the fluid 165 is further reduced. Once this portion of the fluid 165 enters the flow channel 274 of the internal trim 240 from the inlet diffuser plate 234, the fluid 165 may be directed substantially orthogonal to the flow through the multiple trim orifices 272 of the flow plate 270 adjacent the inlet diffuser plate 234. As this portion of the fluid 165 passes through the trim orifices 272, the fluid pressure is further reduced and the fluid 165 mixes with additional streams of fluid 165 entering other flow channels 274. In such fashion, the volumetric flow of fluid 165 is communicated through the internal trim 240 until it is communicated toward the ball plate 245 and outlet diffuser plate 239 located adjacent the fluid outlet 204 and ultimately exits as outlet fluid 166.

As the streams of fluid 165 passing through the internal trim 240 reach the ball plate 245 and the outlet diffuser plate 239 adjacent the fluid outlet 204, multiple streams of flow of fluid 165 may be created there through. Thus, the fluid 165 may experience an additional reduction of pressure as it is communicated out of the throttling ball 230 and to the fluid outlet 204. The ball valve 200 may, therefore, reduce the fluid pressure of the fluid 165 through multiple stages of reduction, such as the inlet diverter 225, the inlet diffuser plate 234 adjacent the fluid inlet 202, the internal trim 240, the ball plate 245, and the outlet diffuser plate 239 adjacent the fluid outlet 204.

Figure 5:
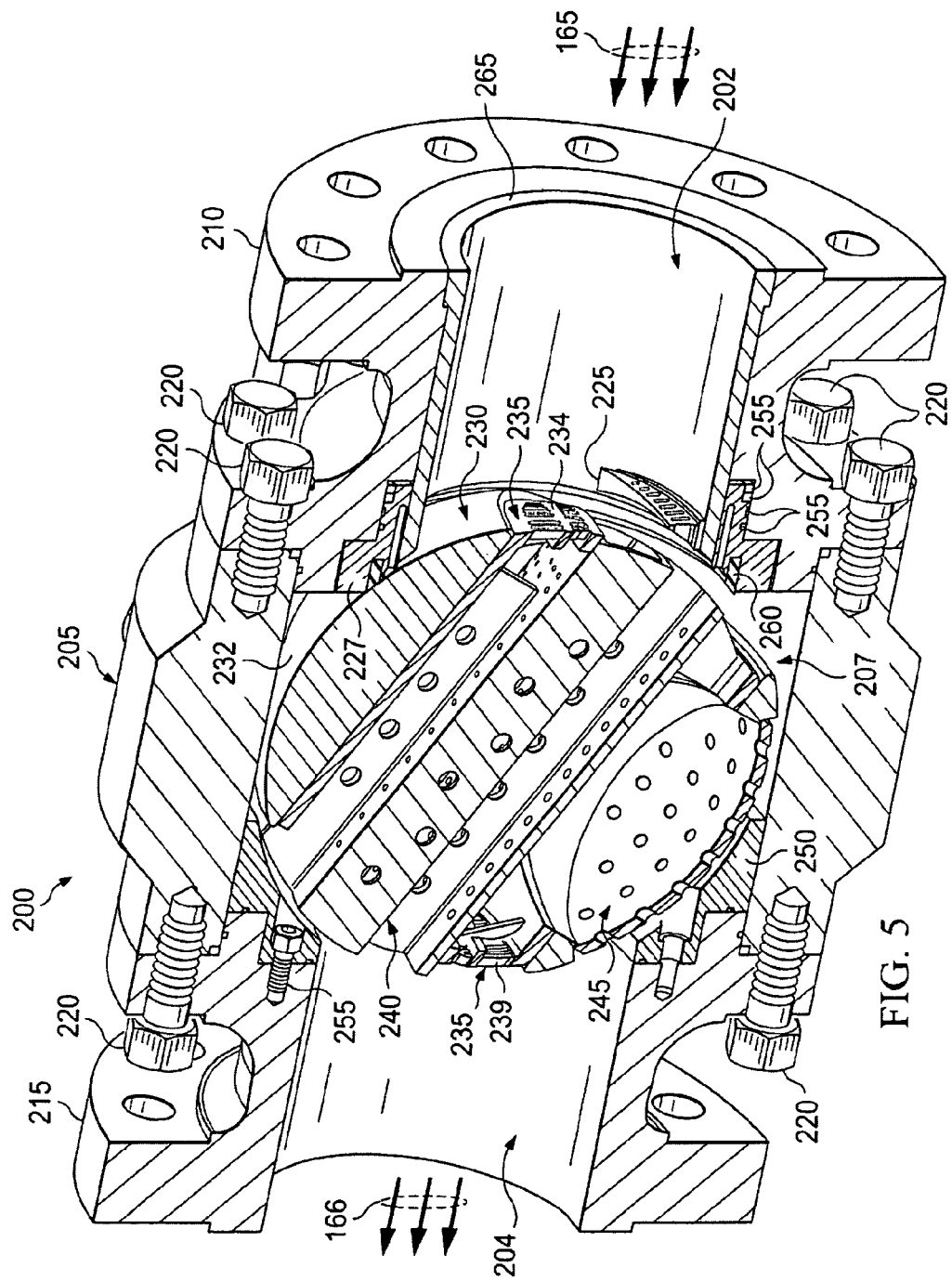
FIG. 5 illustrates a partial cross-sectional view of internal components of a ball valve in another partially open position in accordance with the present disclosure.

FIG. 5 illustrates a partial cross-sectional view of internal components of the ball valve 200 in another partially open position. The throttling ball 230 in the ball valve 200 in this figure may be rotated about 60-degrees from the closed position shown in FIG. 2. Thus, the ball valve 200 in FIG. 4 is partially open to allow fluid communication between the fluid inlet 202 and the fluid outlet 204, and the operation of the ball valve 200 (e.g., the fluid communication there through) may be substantially similar to that illustrated in FIG. 4.

The ratios of pressure reduction attributable to any particular component (e.g., inlet diverter 225, inlet diffuser plate 234, outlet diffuser plate 239, internal trim 240, and ball plate 240) to a total reduction of fluid pressure of the fluid 165 through the valve 200 may be substantially different when the valve 200 is in the 60-degree position versus the 45-degree position shown in FIG. 4. For instance, as the throttling ball 230 is rotated further from the closed position along its axis of rotation, a greater portion of the fluid 165 may be communicated directly from the fluid inlet 202 to the internal trim 240, rather than to, for example, the inlet diverter 225 or the inlet diffuser plate 234 adjacent the fluid inlet 202. Thus, the fluid pressure reduction induced by the internal trim 240 as shown in FIG. 5 may be a larger percentage of the total fluid pressure reduction of the fluid 165 as compared to, for instance, the fluid pressure reduction induced by the internal trim 240 as shown in FIG. 4. Additionally, one or more of the pressure-reducing components of the ball valve 200 such as, for example, the inlet diverter 225, the inlet diffuser plate 234, or the ball plate 245, may provide a decreasing amount of pressure reduction as the throttling ball 230 is rotated further from the closed position, until such pressure reduction may become negligible.

As the throttling ball 230 is rotated further from the closed position shown in FIG. 2, the overall pressure reduction of the fluid 165 as it is communicated from the fluid inlet 202 to the fluid outlet 204 and exits as exit fluid 166 decreases. Thus, as pressure reduction decreases, the volumetric flow rate of the fluid 165 through the ball valve 200 increases.

Figure 6:
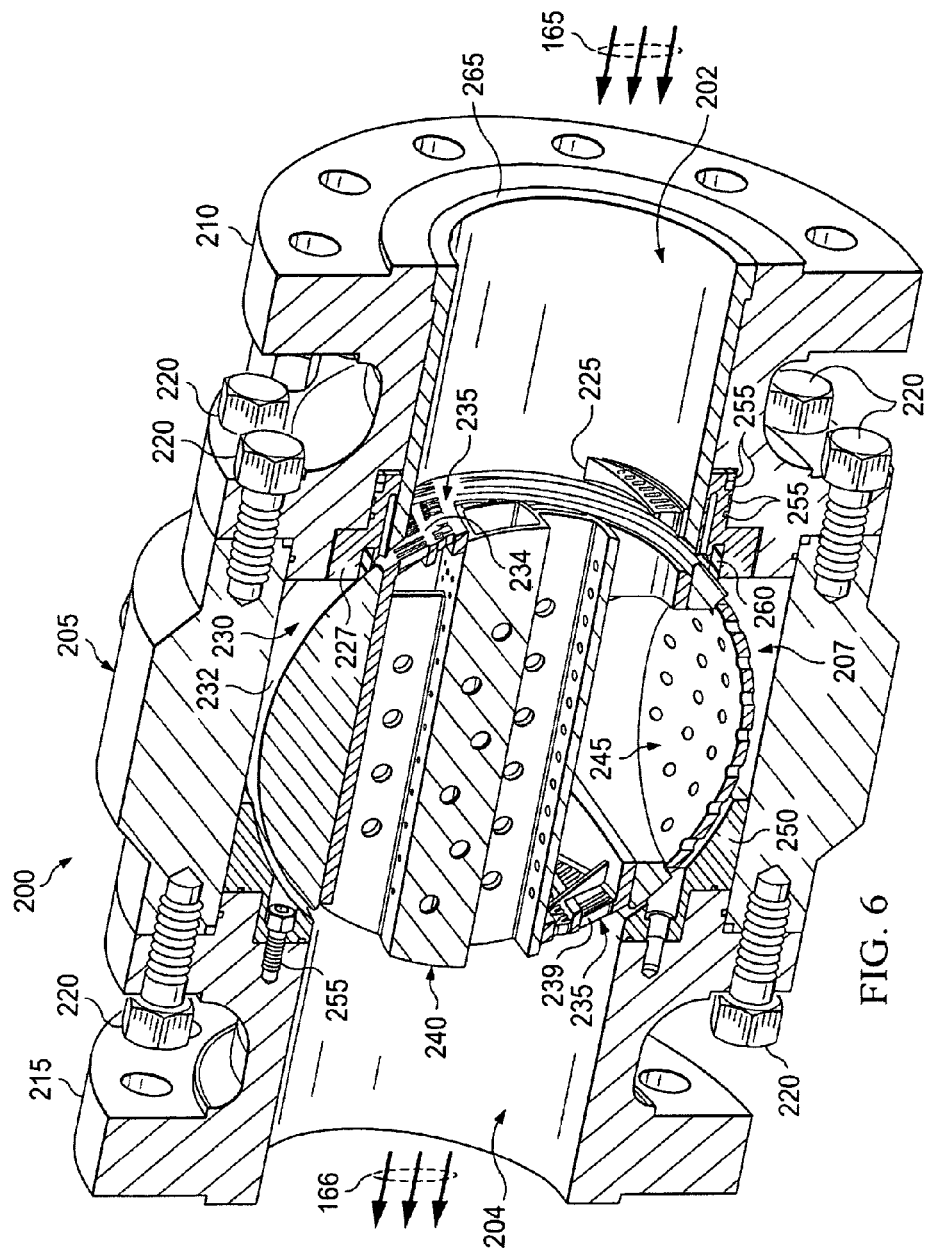
FIG. 6 illustrates a partial cross-sectional view of internal components of a ball valve in a fully open position in accordance with the present disclosure.

FIG. 6 illustrates a partial cross-sectional view of internal components of the ball valve 200 in an open position. The throttling ball 230 in the ball valve 200 in this figure may be rotated about 90-degrees from the closed position shown in FIG. 2. As illustrated in FIG. 6, substantially all of the fluid 165 may be communicated through the internal trim 240 of the throttling ball 230. Thus, the total pressure reduction of the fluid 165 through the ball valve 200 may be substantially equal to the pressure reduction of the fluid 165 due to the internal trim 240. Some portion of the fluid 165, however, may continue to flow through the ball diffuser 235 and subsequently, orthogonally through the flow plates 270. Additionally, some portion of the fluid 165 may continue to flow through the inlet diverter 225 and then into the flow channels 274. As illustrated in FIG. 6, in the 90-degree position, the ball plate 245 may be adjacent the interior surface of the shoe 250 and the valve body 205. Thus, little or no fluid 165 may be communicated through the ball plate 245 in this position.

A number of implementations have been described, and several others have been mentioned or suggested. Furthermore, those skilled in the art will readily recognize that a variety of additions, deletions, alterations, and substitutions may be made to these implementations while still achieving fluid regulation with a ball valve. Thus, the scope of protected subject matter should be judged based on the following claims, which may capture one or more aspects of one or more implementations.

What is claimed is:
1. A valve comprising:
  a body including an upstream flow passage and a downstream flow passage in fluid communication with an interior cavity of the body;
  a throttling ball disposed within the interior cavity, the throttling ball rotatable within the interior cavity on an axis to adjust the valve from a closed position to an open position, the throttling ball including a fluid conduit extending through the throttling ball, the fluid conduit being alignable with the upstream flow passage and the downstream flow passage; and
  the throttling ball further comprising a ball plate disposed in a downstream transverse passage of the throttling ball that intersects the fluid conduit through the throttling ball, the ball plate including a plurality of orifices allowing fluid communication there through; and
  a shoe member disposed in the cavity abutting an interior surface of the cavity and detachably secured to the body, the shoe including a fluid passage there through having an inlet on an upstream side being alignable with the flow conduit of the throttling ball and an outlet being alignable with the downstream flow passage of the body, the shoe having an interior surface comprising at least a partial hemisphere with an opening therein, the interior surface of the shoe disposed adjacent to and tracking an external surface of the throttling ball.

2. The valve of claim 1 further comprising a diffuser disposed through the throttling ball, the diffuser including a diffuser plate at an upstream end of the flow conduit, the diffuser plate including a plurality of apertures allowing fluid communication there through substantially orthogonal with the axis of rotation of the throttling ball.

3. The valve of claim 2, wherein the diffuser plate is a first diffuser plate, the diffuser including a second diffuser plate proximate the fluid outlet, the second diffuser plate including a plurality of apertures allowing fluid flow there through substantially orthogonal with the axis of rotation of the throttling ball.

4. The valve of claim 2 further comprising an internal trim disposed in the fluid conduit, the internal trim comprising a plurality of flow plates aligned substantially perpendicular to the axis of rotation of the throttling ball, each flow plate allowing fluid communication through a plurality of orifices disposed through the flow plate, the fluid communication through the orifices substantially orthogonal to the fluid communication through the plurality of apertures of the diffuser plate.

5. The valve of claim 4, wherein the flow plate includes a plurality of orifices there through allowing fluid communication substantially perpendicular to the axis of rotation of the throttling ball.

6. The valve of claim 4, wherein the internal trim comprises between and including two flow plates and five flow plates.

7. The valve of claim 4, wherein the internal trim further comprises at least one support plate disposed generally parallel to the axis of rotations of the throttling ball and between at least two flow plates, the support plate secured to the at least two flow plates, the support plate allowing fluid communication through a plurality of orifices disposed through the support plate.

8. The valve of claim 7, wherein two flow plates and two support plates form a rectilinear flow passage through the trim.

9. The valve of claim 1, wherein a cross sectional area of the shoe inlet is substantially equal to a cross sectional area defined by a chord intersecting the surface of the throttling ball, the shoe outlet having a cross sectional area substantially equal to a cross sectional area of the downstream flow passage.

10. The valve of claim 9, wherein the chord intersecting the surface of the throttling ball is shorter than the throttling ball diameter.

11. The valve of claim 1, wherein the interior cavity is substantially cylindrical and an exterior surface of the shoe is adapted to mate with at least a portion of an interior cylindrical surface of the body.

12. The valve of claim 1 further comprising at least one of an inlet closure member detachably secured to the body and having the upstream flow passage there through, and an outlet closure detachably secured to the body and having the downstream outlet passage there through.

13. The valve of claim 12, wherein the inlet closure includes a sleeve insertable in the upstream flow passage, the sleeve substantially cylindrical and adapted to allow fluid communication to the fluid body.

14. The valve of claim 13 further comprising an inlet diverter detachably secured to the sleeve in the upstream flow passage and extending from the sleeve, the inlet diverter including a plurality of slots allowing fluid communication there through.

15. The valve of claim 1 further comprising a seat adjacent the body, the seat adapted to contact the throttling ball and substantially prevent fluid communication between the external surface of the throttling ball and the interior cavity.

16. The valve of claim 1 further comprising a stem insertable through the body along the axis of rotation of the throttling ball, the stem coupled to the ball on an inboard end of the stem, the stem coupled to a valve actuator on an outboard end of the stem.

17. A method of regulating a fluid comprising:
providing a valve in fluid communication with an upstream flow passage and a downstream flow passage, the valve comprising:
a body including an interior cavity in fluid communication with the upstream flow passage and the downstream flow passage;
a throttling ball disposed within the interior cavity, the throttling ball including a fluid conduit extending through the throttling ball, and a ball plate including a plurality of orifices; and
a shoe member disposed in the cavity abutting an interior surface of the cavity and detachably secured to the body, the shoe including a fluid passage there through having an inlet on an upstream side being alignable with the flow conduit of the throttling ball and an outlet being alignable with the downstream flow passage of the body, the shoe having an interior surface comprising at least a partial hemisphere with an opening therein, the interior surface of the shoe disposed adjacent to and tracking an external surface of the throttling ball;
providing a fluid to the upstream fluid passage;
rotating the throttling ball in the body from a closed position to at least partially align the flow conduit with the upstream flow passage and the downstream flow passage in a partially open position; and
directing fluid communication from the upstream flow passage through at least a portion of the conduit of the throttling ball and at least one of the plurality of orifices of the ball plate to the downstream flow passage.

18. The method of claim 17, the valve further comprising a diffuser disposed through the throttling ball, the diffuser including a diffuser plate at an upstream end of the flow conduit, the diffuser plate including a plurality of apertures, the method further comprising directing fluid communication from the upstream fluid passage through at least a portion of the diffuser plate apertures.

19. The method of claim 18, the valve further comprising an internal trim disposed in the fluid conduit, the internal trim comprising a plurality of flow plates aligned substantially parallel to the axis of rotation of the throttling ball, each flow plate comprising a plurality of orifices disposed there through, the method further comprising directing fluid communication substantially perpendicularly from the diffuser plate apertures through the plurality of orifices of each flow plate.

20. The method of claim 19, the partially open position consisting of about 45-degrees of rotation of the throttling ball about the axis of rotation, wherein directing fluid communication from the upstream flow passage through at least a portion of the conduit of the throttling ball to the downstream flow passage comprises directing fluid communication from the upstream flow passage through at least a portion of the diffuser plate apertures substantially perpendicularly to the plurality of flow plates.

21. The method of claim 19 further comprising rotating the throttling ball from a first partially open position consisting of 45-degrees of rotation of the throttling ball about the axis of rotation to a second partially open position of about 60-degrees rotation of the throttling ball about the axis of rotation, wherein directing fluid communication from the upstream flow passage through at least a portion of the conduit of the throttling ball to the downstream flow passage comprises directing fluid communication from the upstream flow passage to the plurality of flow plates.

22. The method of claim 17, wherein the valve further comprises an inlet diverter extending into the upstream fluid passage, the inlet diverter including a plurality of slots there through, the method further comprising directing fluid communication through the plurality of slots of the inlet diverter.

23. The method of claim 17, wherein providing a fluid to the upstream fluid passage comprises providing a gas to the upstream fluid passage.

24. A valve comprising:
- a body including an upstream flow passage and a downstream flow passage in fluid communication with an interior cavity of the body;
- a throttling ball disposed within the interior cavity, the throttling ball rotatable within the interior cavity on an axis to adjust the valve from a closed position to an open position, the throttling ball including a fluid conduit extending through the throttling ball, the fluid conduit being alignable with the upstream flow passage and the downstream flow passage;
- a seat adjacent the body, the seat adapted to contact the throttling ball and substantially prevent fluid communication between an external surface of the throttling ball and the interior cavity; and
- a shoe member disposed in the cavity abutting an interior surface of the cavity and detachably secured to the body, the shoe including a fluid passage there through having an inlet on an upstream side being alignable with the flow conduit of the throttling ball and an outlet being alignable with the downstream flow passage of the body, the shoe having an interior surface comprising at least a partial hemisphere with an opening therein, the interior surface of the shoe disposed adjacent to and tracking an external surface of the throttling ball.

25. The valve of claim 24 further comprising:
- a diffuser disposed through the throttling ball, the diffuser including a diffuser plate at an upstream end of the flow conduit, the diffuser plate including a plurality of apertures allowing fluid communication there through substantially orthogonal with the axis of rotation of the throttling ball;
- an internal trim disposed in the fluid conduit, the internal trim comprising a plurality of flow plates aligned substantially perpendicular to the axis of rotation of the throttling ball, each flow plate allowing fluid communication through a plurality of orifices disposed through the flow plate, the fluid communication through the orifices substantially orthogonal to the fluid communication through the plurality of apertures of the diffuser plate; and
- the internal trim further comprising at least one support plate disposed generally parallel to the axis of rotation of the throttling ball and between at least two flow plates, the support plate secured to the at least two flow plates, the support plate allowing fluid communication through a plurality of orifices disposed through the support plate.

* * * * *